Sept. 17, 1946.  H. D. FOWLER  2,407,774
AIRPLANE CONSTRUCTION
Filed Dec. 28, 1942   5 Sheets-Sheet 1
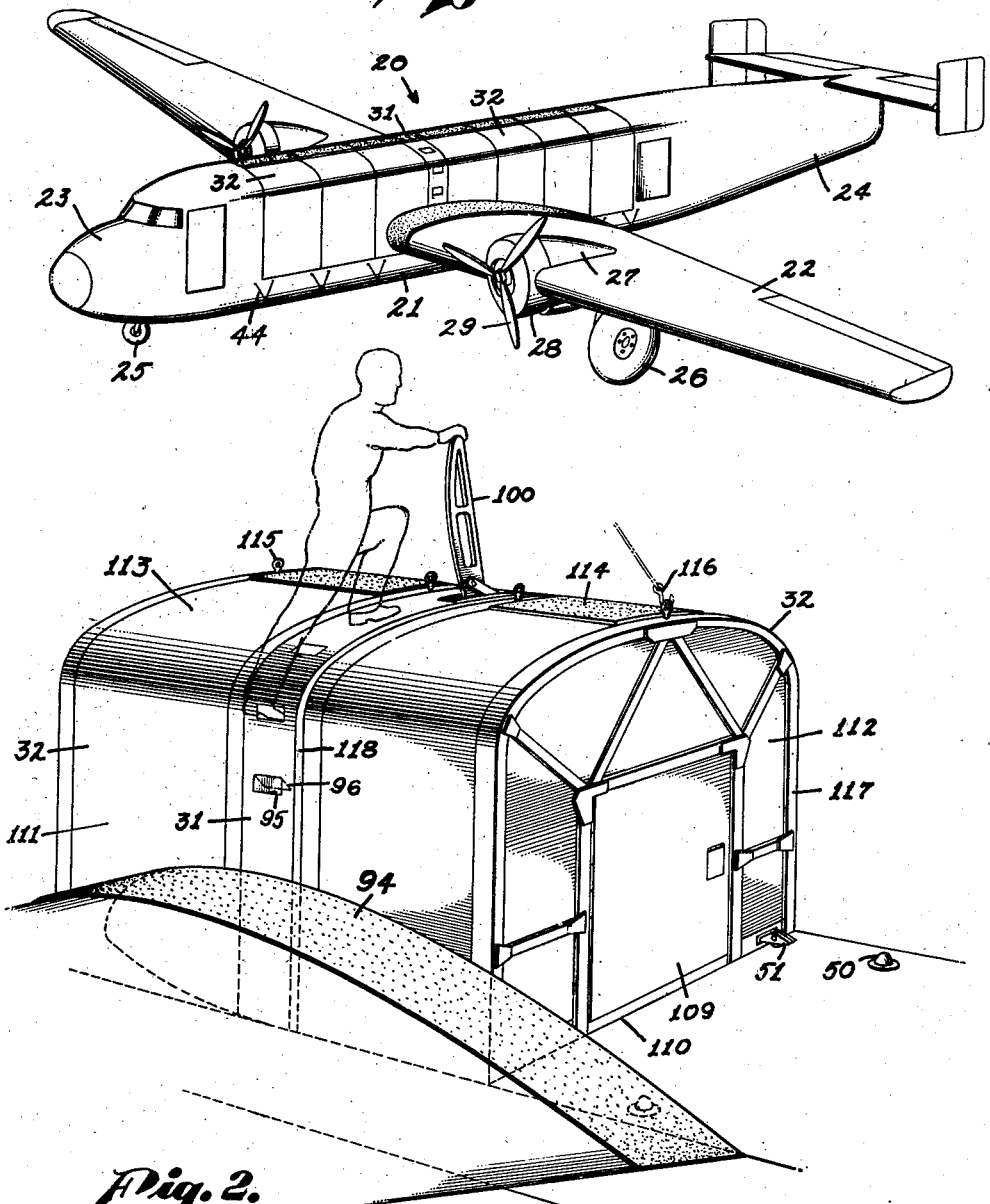
INVENTOR.
HARLAN D. FOWLER,
BY
ATTORNEY.

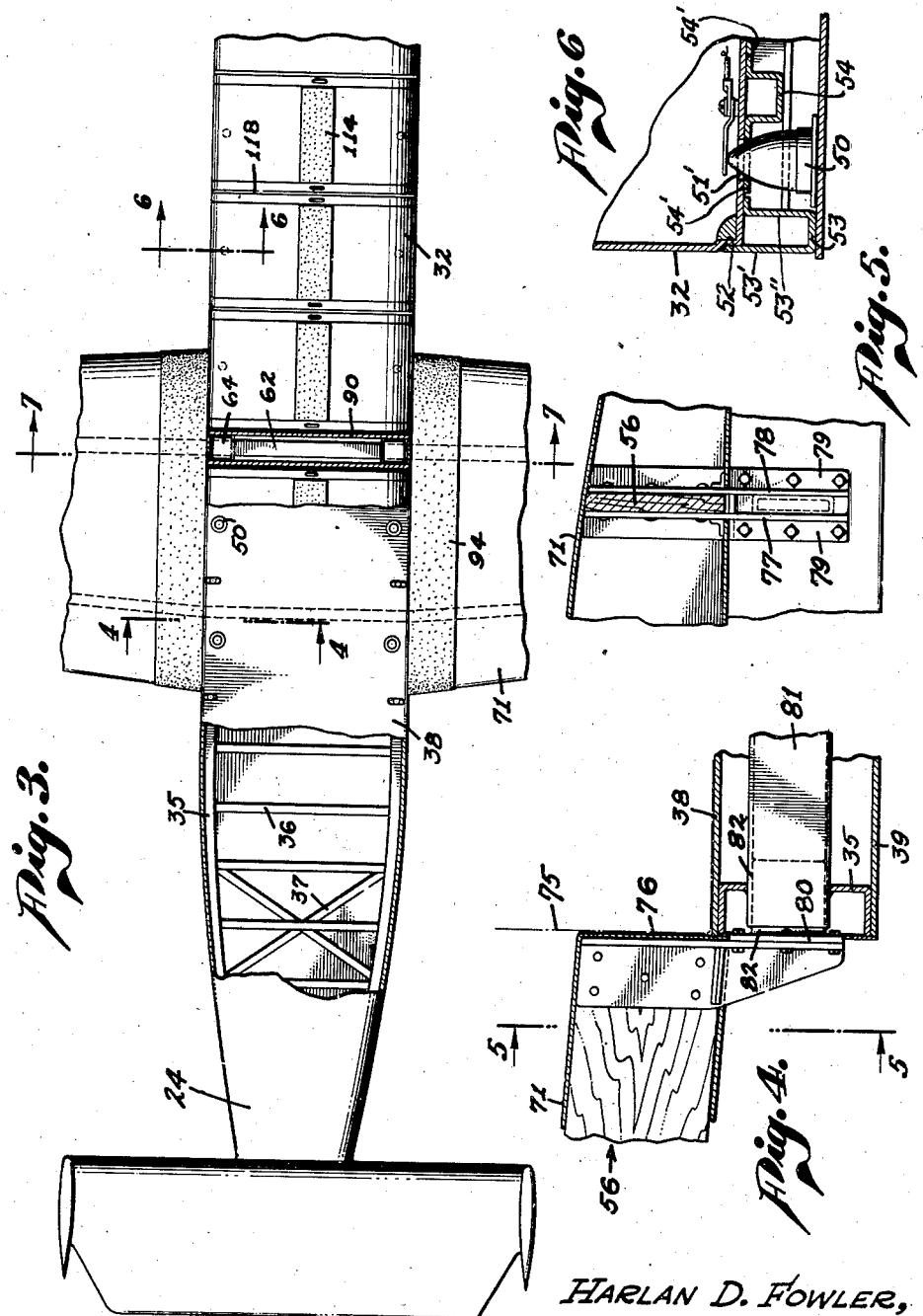

Sept. 17, 1946.　　　　H. D. FOWLER　　　　2,407,774
AIRPLANE CONSTRUCTION
Filed Dec. 28, 1942　　　　5 Sheets-Sheet 3
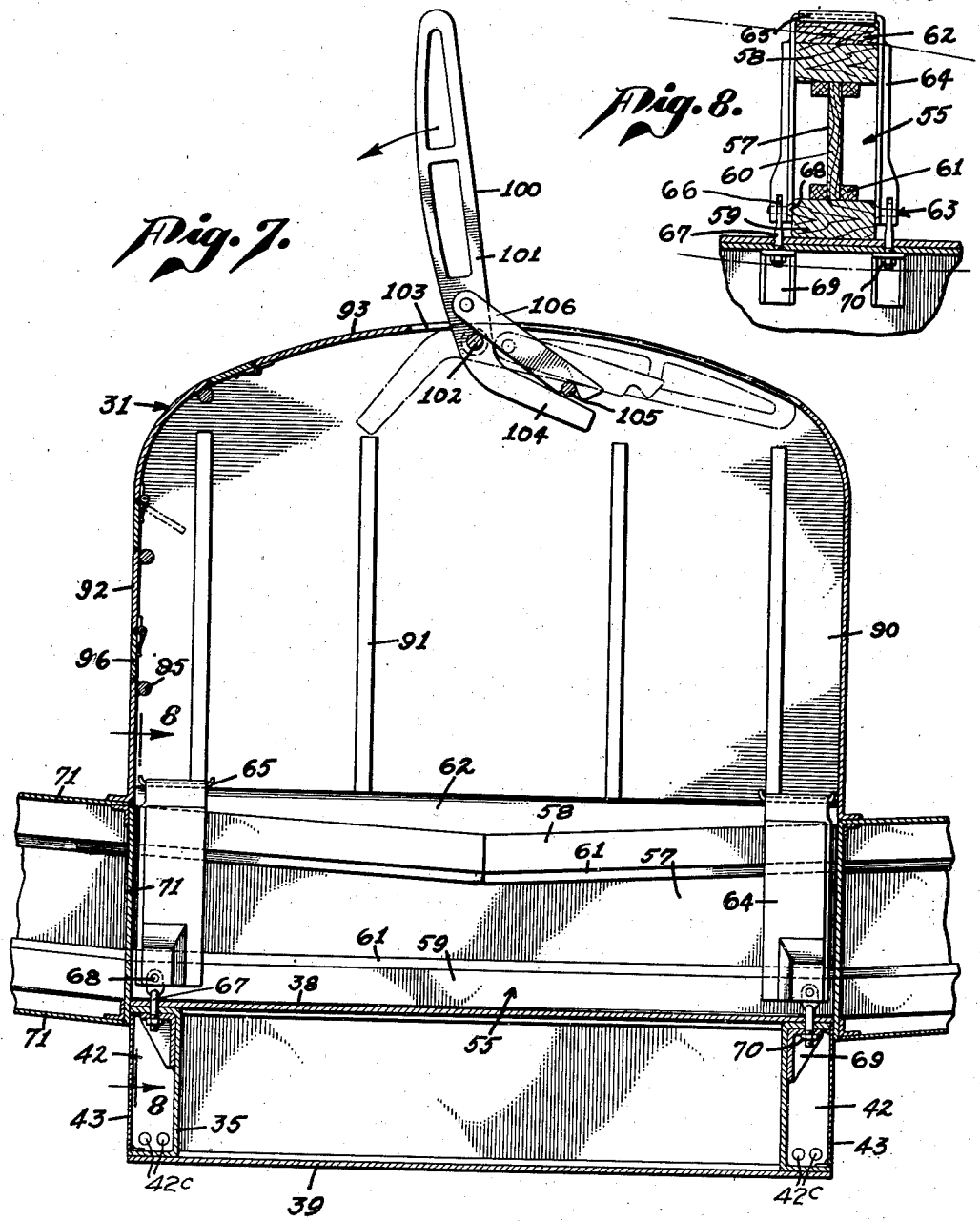
Harlan D. Fowler,
INVENTOR.
BY
ATTORNEY.

Sept. 17, 1946.                H. D. FOWLER                 2,407,774
                            AIRPLANE CONSTRUCTION
                            Filed Dec. 28, 1942            5 Sheets-Sheet 4

HARLAN D. FOWLER,
INVENTOR.

BY
ATTORNEY.

Sept. 17, 1946.  H. D. FOWLER  2,407,774
AIRPLANE CONSTRUCTION
Filed Dec. 28, 1942  5 Sheets-Sheet 5
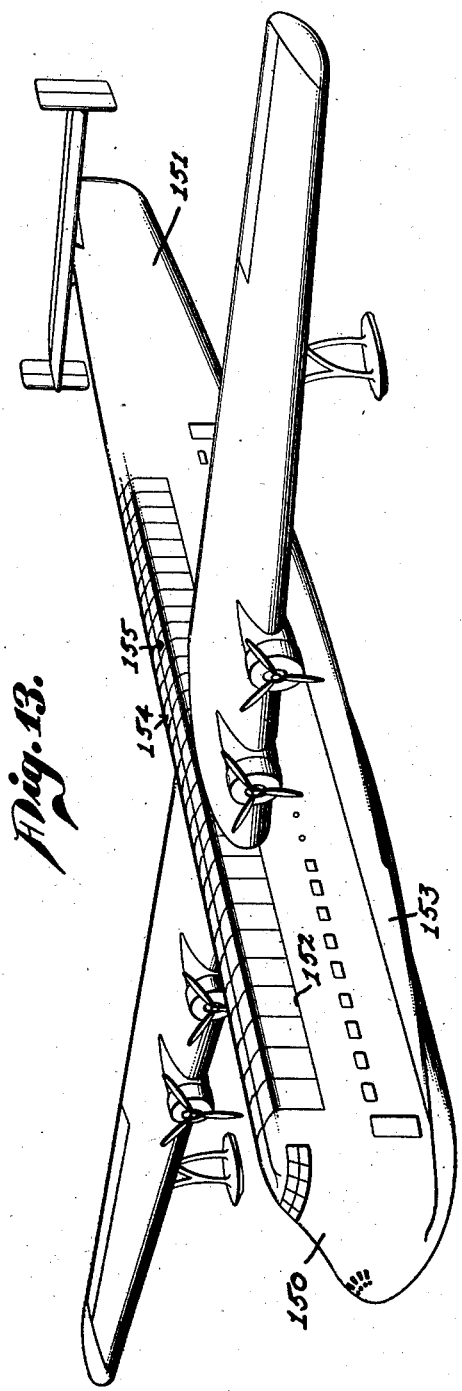
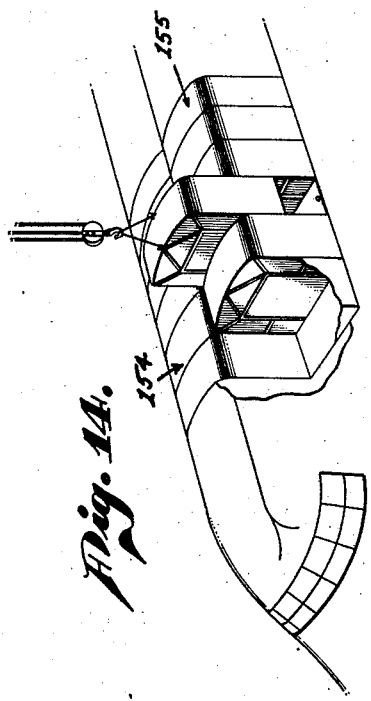
Harlan D. Fowler,
INVENTOR.
BY
ATTORNEY.

Patented Sept. 17, 1946

2,407,774

UNITED STATES PATENT OFFICE 2,407,774

AIRPLANE CONSTRUCTION

Harlan D. Fowler, San Diego, Calif.

Application December 28, 1942, Serial No. 470,326

11 Claims. (Cl. 244—118)

Present day conversions and adaptations of passenger carrying airplanes to the cargo trade are make-shift and economically unsound. One of the principal difficulties is the problem of moving large assortments of various shapes and sizes of crated merchandise through the small doors of conventional aircraft, and doing it quickly. The availability of working space necessarily limits the size of a cargo handling crew to a few men. Furthermore the cargo must be placed in such a manner as to properly balance the ship, and should be stowed so that parcels for intermediate points are quickly available for identification and unloading.

An analysis of collected data indicates that an average time of 5.4 man-hours per ton is required to load and properly balance a ship, and 3.6 man-hours per ton to unload. A general false impression has been prevalent that because commercial airline equipment is being operated at air speeds ranging in the neighborhood of 165 to 200 M. P. H., the cargo problem has been satisfactorily solved. However, a study of factors influencing the time required to move cargo from one place to another shows that speed of moving passengers and speed of moving cargo are not the same thing. A shipper is only interested in the time required to pick up his merchandise, move it to point of destination, and set it down again. That means that cargo handling time must be added to flying time in order to arrive at a reliable block-to-block rate of travel. In the case of operators employing converted equipment, actual block-to-block cargo hauling speed is about 40% slower than the block-to-block speed of the same airplane carrying passengers. As the same high cost of speedy passenger operation maintains for the considerably lower speed of cargo movement, this results in a cost speed ratio that is definitely undesirable. In other words the problem of handling air cargo efficiently is one that cannot be answered simply by increasing speed of flight.

With the foregoing facts in mind it is apparent that an aircraft designed to handle freight must be capable of extremely fast loading and unloading. Providing this is achieved, then lower cost, lower powered equipment, can be profitably employed and higher block-to-block speed can be obtained. Consequently operational costs may drop and with them, freight rates.

In studying the problem of cargo plane design, it becomes apparent that conventional monocoque or trussed tube methods of construction cannot be satisfactorily employed, as the problems of transferring extreme loads around the large openings necessary for handling cargo require structures of excessive weight and complexity.

My Patent No. 1,992,941 granted March 5, 1935, for Airplane construction, offers one solution to the various problems indicated above. In this patent I disclosed a platform as the actual load carrying element of the fuselage, and removable cargo containers adapted to be clamped upon the platform, or as an alternative the freight to rest directly upon the platform and the space be covered by a suitable cowling, the containers or the cowling affording a secondary non-critical supporting structure, unaffected by any size of entrance or opening. I provided a cantilever box beam type of platform, illustrating a metal construction with the deck of the platform made of corrugated sheet metal, and the containers are also being made of corrugated sheet metal.

The present application discloses and claims various improvements over the subject matter of my prior patent.

One object of my present invention is to utilize a platform and cargo container combination adaptable to the employment of wood for the framework, the deck of the platform, etc.

Another object is to produce a low wing monoplane type in which the wings provide engine mountings, and wherein a minimum clearance between ground and platform occurs when the plane is on the ground, yet the engines are mounted at sufficient height for the propellers to clear the ground.

A more specific object of my invention in the latter connection is to provide a platform and wing combination in which the leading or main spar of the wing rests upon and is supported by the platform; and in such connection a relatively narrow housing is permanently attached to the platform and the outline of which housing represents a cross section of the streamlined surface of the plane fuselage assembled for flight.

An additional object of the invention is to provide in a housing construction of the character described in the preceding paragraph an escalator or steps whereby an operator may gain access to the top of the housing for assisting in loading or unloading cargo containers from the platform; and in that connection and as a further improvement to incorporate in the housing a safety arm or guard which may be concealed within the housing during flight, and extended upwardly from the housing as a safety element for an operator when the plane is on the ground, particularly when snow and ice has collected on the top of the fuselage.

A further object of the invention is to provide in an airplane of the character described, a channel along the side of the platform to house the airplane flight control cables, container lock controls, etc., covering said channel with fabric or other skin, and providing convenient devices therein for opening the covering at designated points to gain access to the cables and controls when desired.

A still further object is to provide in an airplane of the character described, reinforced surface areas on the top of the several containers and the housing, affording a catwalk longitudinally along the upper surface of the assembled airplane.

A still further object of the invention is to provide means for properly locating the containers on the platform, and preventing side shift, as well as novel means for securing the containers to the platform.

A still further object is to provide a suitable temperature controlled refrigerating unit in an airplane of the character described, as well as optional air conditioning, and "dry ice" compartments.

These and other objects of my invention will become more apparent from a consideration of the full disclosure.

In the drawings:

Figure 1 is a perspective view of an assembled airplane embodying my invention.

Figure 2 is a fragmentary enlarged perspective view of the central portion of the airplane shown in Figure 1 and taken from the opposite direction.

Figure 3 is a top plan view of the airplane, with some of the cargo containers removed, and also with parts in section.

Figure 4 is an enlarged fragmentary cross section taken on the line 4—4 of Figure 3.

Figure 5 is a cross section taken on the line 5—5 of Figure 4.

Figure 6 is an enlarged fragmentary cross section taken on the line 6—6 of Figure 3, illustrating a locating plug and socket.

Figure 7 is a cross section of the airplane taken on the line 7—7 of Figure 3.

Figure 8 is a fragmentary cross section taken on the line 8—8 of Figure 7.

Figure 9 is an elevation, generally diagrammatic, illustrating an arrangement for refrigerating the containers, either on the plane or on a loading platform.

Figure 10 is a diagrammatic plan view of the same system.

Figure 11 is a vertical section illustrating an arrangement for air conditioning the containers, either on the plane or on a loading platform.

Figure 12 is a horizontal sectional view illustrating a container equipped with "dry ice" compartments.

Figure 13 is a perspective view of a modified form of my invention embodied in a seaplane, with twin banks of cargo containers. The same arrangement may be incorporated in large land planes.

Figure 14 is a fragmentary perspective view of the same seaplane showing one of the containers being either installed in or removed from the platform of the ship.

In Figure 1 I have illustrated a low wing monoplane 20 comprising a fuselage platform 21, wings 22, a nose compartment 23, a tail assembly 24, and a tricycle landing gear comprising forward nose wheel 25, and aft main wheels 26. The landing gear is preferably designed so that the fuselage is maintained level on the ground. The wings provide support for engine nacelles 27 mounting engines 28 which drive propellers 29. The nose compartment 23 is preferably a permanent part of the fuselage, and contains accommodations for the crew, controls, and may provide space for mail, a limited number of passengers, or small articles of cargo. The tail assembly 24 is also preferably a fixed part of the fuselage, and includes elevators and rudders, and also provides space for mail, etc.

The nose compartment and tail assembly are supported and joined by the elongated platform 21 which extends substantially the length of the plane, and affords the primary frame structure of the fuselage. At the center of gravity, which is intermediate the nose compartment and tail assembly, the wings 22 are mounted on the platform in a manner hereinafter described. Near the leading edge of the wings, and for purposes later explained, a housing 31 is built onto the platform, having an external outline conforming to a cross section of the streamline of the midsection of the plane. The platform 21 is also adapted to support a plurality of removable cargo containers 32 between the nose compartment and the tail assembly which are formed with exterior surfaces conforming to the streamline fuselage design, so that when assembled on the platform they complete the outline of the plane. The bottom of the container in each case is provided with recessed peripheral edge portions 52 and a U-shaped rib 53 having one leg 53' extending into the recessed edge and another leg 53" bent over and placed flat against the exterior of the bottom. Reinforcing ribs 54 may be parallel to and spaced from the ribs 53. Outwardly turned portions 54' lie against the bottom and, where located over a socket 51, are apertured to provide a reinforcement for the socket.

The platform is shown more particularly in Figures 3 to 5. It may utilize any suitable frame, such as the longitudinal beams 35, bulkheads 36, and any desirable intermediate bracing, as indicated at 37, which frame members can be made of wood for economy in materials and manufacturing operations, or of any other suitable material. An important objective is the production of planes at low cost and without the need of presses and other expensive machines required in manufacturing all-metal planes. The platform may be surfaced by decking 38, and have a bottom covering 39 of any suitable skin.

The beams 35 are preferably U shaped, with the open side out to afford channels 42 for the reception of loading gear and plane control cables, etc. These channels are covered with a fabric or other skin 43, which is preferably provided with V shaped flaps 44 closed by conventional zipper fasteners, providing access for inspection and adjustment of the various controls and cables. By this arrangement, all loading controls and cables indicated at 42c in Figure 7 for ailerons, elevators, rudders, etc. are conveniently enclosed in the two channels on opposite sides of the plane, and are readily accessible.

A platform of the character shown and described may be level throughout its length, or may have the tail slightly inclined. The important thing is that the cargo containing section be flat, which in combination with the tricycle landing gear assures that the cargo platform space is perfectly level for loading and unloading operations, and is close to the ground.

In the deck of the platform at correctly spaced locations are centering plugs 50 adapted to cooperate with the complementary sockets 51' in the bottom of the containers for centering the containers in their correct positions on the deck, and preventing the containers from shifting when in flight. The containers are removably secured upon the deck by any suitable clamps 51, details of one form being shown in my earlier Patent No. 1,992,941 and improved forms being disclosed and claimed in my copending application, Serial No. 469,620, filed December 21, 1942.

The relationship between the platform and the wings is an important feature of my invention.

The wing structure includes a leading main spar 55, and a trailing false spar 56. As one form of leading spar suitable for the purpose, I show a compound I beam 57 comprising an upper member 58 and a lower member 59 vertically spaced by a web 60 which is flanked by locking strips 61. A V block 62 (corresponding to the dihedral angle of the wings) rests upon the upper member 58, and the whole spar is clamped down upon the deck of the platform by a clamp assembly 63. This assembly comprises an inverted U bracket 64 seating upon the block 62, a plate 65 being interposed to protect the block. The bracket is formed with slots 66 adapted for the reception of eye bolts 67 which engage pins 68 in the bracket. The eyebolts pass through the deck and channel beam of the platform and through reinforcing angle members 69, against which nuts 70 are tightened. The wings are suitably built upon the spars, and include skin 71 which covers also the inner ends of the wings adjacent the platform.

The rear false spar 56 is so constructed and mounted as to occupy no space on the deck of the platform. Referring to Figures 4 and 5, I show the spar 56 offset at the line 75 by means of a bracket 76. This bracket 76 comprises a pair of plates 77 and 78, the upper portions of which are bolted on opposite faces of the spar 56. These plates are formed with flanges 79 which are complementary at their lower portions to a flange 80 at the end of a bar 81 (which for lightness may be hollow) extending across through the platform, being welded to the channel beam 35 if desired. For structural convenience, the flange 80 may be formed with a shank 82 adapted to fit in the tubular bar 81, but in effect the flange and bar are one piece.

This arrangement of wing mounting permits the platform to be maintained close to the ground for loading and unloading (a height of 38" being entirely feasible), while at the same time, the propellers 29 have ample clearance from the ground. Moreover, the leading spar is relatively narrow and occupies a minimum of space on the platform, and the trailing false spar is secured to the platform in such manner that it does not encroach upon the deck, which is thus entirely available for cargo containers except where the leading spar is fastened.

The housing 31 may be built up of any suitable frame, with a skin covering, or the end walls 90 may be inherently rigid, and if desired they may be reinforced as by members 91. The end outline conforms to the cross section of the assembled plane design, being coextensive in cross section with the cargo containers. This housing covers the leading wing spar, thus being relatively thin, and filling the space between the two adjacent center cargo containers. The end walls 90 are substantially flat, providing for relatively close association with the contiguous substantially flat walls of the containers. It is desirable that the exposed sides 92 and top 93 of the housing have the skin on the outside of any frame structure to conform to the streamlining of the plane, but at the ends 90 any framework of the housing may be on the outside if desired.

The upper surface of the wing near the fuselage is provided with a reinforced strip 94 affording a walk, and steps 95 are formed in the side of the housing for use as illustrated in Figure 2. These steps preferably are normally closed by trap doors 96 which yield inwardly when pushed.

At the top of the housing is secured a safety arm or guard 100 which can be folded inside the housing when not in use. It comprises an arm 101 pivotally mounted at 102 within the housing, and extendable through a slot 103 in the top of the housing. The arm has an extension 104 adapted to engage a stop 105 in the housing. Pivotally carried on the arm is a link 106 formed with a notch 107 also adapted to engage the stop 105 on the side opposite the extension 104. The arm may thus be retained in its extended position as shown in full lines in Figure 7. To fold the arm, the link 106 is raised from the stop 105 and the arm may then be pivoted and lowered into the dotted line position of Figure 7, resting upon the stop 105.

Details of the cargo containers 32 which are particularly suitable for use in this plane are shown and claimed in my copending application Serial No. 469,390, filed December 18, 1942. Irrespective of their detailed construction, they are closed boxes with doors 109 for access, having flat bottoms 110, substantially perpendicular side walls 111 and end walls 112, and an oval top 113 conforming to the cross sectional curve of the streamlined plane design. On the top of each container is preferably a longitudinal reinforced strip 114 which provides a catwalk for an operator when servicing, loading or unloading the plane. The containers are provided with lugs 115 to which hooks 116 of a crane (not shown) may be attached for loading the containers on the platform or removing them therefrom.

The containers may be of unit size, as illustrated, or longer, depending upon the type of transportation desired. The containers preferably have a horizontal partition (see Figure 11) dividing each one into a lower compartment and an upper compartment. The lower compartment is accessible through the end door 109 and the upper container may be accessible through a cowling or side door (not shown here, but which is illustrated in the said copending case Serial No. 469,390). The preferred construction of the containers is such that the main support is provided by end frames 117 having an outside configuration conforming to the streamlined fuselage design. The skin of the containers on the ends is inside these frames, and any longitudinal frame members are preferably placed at such height as to not contact cargo stowed in the containers. The containers when mounted on the airplane normally are spaced apart very slightly, as indicated at 118, but this space has no effect on the flight of the plane, and as before noted, the plane will fly safely without the containers, or with only part of them in place.

In Figures 9 and 10 I illustrate a refrigerating system which may be incorporated either in the airplane or in a loading dock, or may be used in both, so that the containers may be suitably refrigerated. On the deck 38 of the platform 21 I may mount a refrigerating unit 125 of conventional compressor type, circulating a refrigerant by means of pipes 126 through coils 127. The pipes 126 are most conveniently located in the channel 42 of the platform member 35, and the coils are preferably above the deck 38. Suitable couplings 129 of quick detachable or any other type may be employed between coils and pipes. In this system it is feasible to place the coils in the bottom structure of the containers, below the floor 130, any necessary modification in the container bottom structure being made to accommodate the coils. It may also be desirable to utilize a conventional thermostatic control 131, connected through wiring 132 and the plugs 50. It is obvious that a similar refrigerating installation could be incorporated in a loading dock, so that perishable goods, or goods requiring refrigerating would be properly cooled continuously except for the momentary time required for loading the container onto the airplane.

In Figure 11, I show an air cooling system comprising a blower 135, which delivers conditioned air through a pipe 136 into the containers through a modified form of plug 50a, which may have a hole therein and a connection 137 with the pipe. A thermostat 138 may be used to control the admission or temperature of air. To facilitate circulation, it is preferable to modify the containers so that the horizontal partition 139 has perforations 140, and to provide perforations 141 in the ends of the containers, at least in the upper compartments. This air conditioning system may be incorporated in a loading dock 142, or in the airplane platform, or both.

Another modification, shown in Figure 12, contemplates compartments 145 in the containers for reception of "dry ice." Perforations 146 in the walls and bottoms of the compartments provide for entry of the chilled air into the cargo compartment 147 of the containers.

The seaplane, shown in Figures 13 and 14, being preferably larger than the land plane illustrated in Figure 1, utilizes the platform and cargo container features, but more conveniently in the manner illustrated.

Thus, the seaplane has a nose compartment 150, a tail assembly 151, and a platform 152, the latter being constructed, however, above the hull 153 in which crew and passenger cabins may be located.

As the seaplane is relatively wide, it is preferable to utilize twin banks of containers 154 and 155. A similar arrangement may be used on very large land planes.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

The essence of my invention resides in a cargo airplane embodying an elongated platform supporting a nose compartment and a tail assembly, and providing a space between nose compartment and tail assembly for the reception of cargo containers which are interchangeable, and the side and top exteriors of which conform to the streamlined design of the airplane, in which the leading spar of the wing is supported on or above the platform to give height to the wing for clearance of propellers without necessitating a high platform, and the trailing (false) spar is mounted in a manner not to encroach upon the platform deck. Other features are the use of a tricycle landing gear maintaining the platform level when the plane is on the ground, a built-on housing over the leading wing spar providing an escalator, a safety guard at the top of the housing, and a catwalk on the top of the containers. Important also is the platform construction providing side channels for the loading controls, cables of the flight controls, etc., and shift preventing plugs. These features are specified not by way of limitation but by way of emphasis only.

Having described my invention, what I claim as new and desire to secure by Letters Patent is:

1. An airplane construction comprising an elongated exposed fuselage platform, a nose compartment and a tail assembly permanently supported at opposite portions of said platform with a cargo space on said platform separating the nose compartment and tail assembly, a wing having sections including a leading spar extending laterally from both sides of the platform, the leading spar of the wing sections resting on and being supported by said platform, freight container positioning members disposed upon said platform, and a vantage and observation post for directing the positioning of freight containers relative to said members provided with a pivotally mounted guard member, said post being positioned upon and above said spar.

2. An airplane construction comprising an elongated exposed fuselage platform, a nose compartment and a tail assembly permanently supported at opposite end portions of said platform with a cargo space on said platform separating the nose compartment and tail assembly, a wing having sections including a leading spar extending laterally from both sides of the platform, the leading spar of the wing sections resting on and being supported by said platform, freight container positioning members disposed upon said platform, and a vantage and observation post provided with a normally faired but extensible guard member, said post being positioned above the level of said platform and upon said leading spar, said leading spar comprising a beam including an upper member and a lower member vertically spaced by a web, locking strips flanking said web, a V block substantially corresponding to the dihedral of the wings supported on said upper member, an inverted U bracket seating on said block, and adjustable means clamping said spar to said platform.

3. In an airplane construction which comprises an elongated fuselage platform having an exposed deck, a nose compartment and a tail assembly permanently supported at opposite end portions of said platform with a cargo space on the platform separating the nose compartment and tail assembly, a wing having sections including a leading spar and a trailing spar extending laterally from both sides of the platform, the leading spar of the wing section resting upon and being supported by said platform, and the trailing spar of said wing section being supported by said platform below the deck thereof, freight container positioning members disposed upon said platform, and a pivotally mounted guard member positioned above the level of said platform; channel beams disposed below and along lateral edges of said platform, said beams having open channel portions disposed so as to face laterally of said platform, said leading spar comprising a beam including an upper member and a lower member vertically spaced by a web, locking strips flanking said web, a V block substantially corresponding to the dihedral of the wing supported on said upper member, an inverted U bracket seating on said block, and means extending through said platform and into the channel in said channel beams and accessible from the side of the airplane for adjustably clamping said spar to said platform.

4. In an airplane construction including an elongated fuselage platform, a nose compartment and a tail assembly permanently supported at opposite end portions of said platform with a cargo space separating the nose compartment and tail assembly, a lever member pivotally mounted on said airplane adapted to be faired inside of the external surface of said airplane for flight and adapted to be extended upwardly and outwardly from the surface of said airplane as a safety guard for an operator standing upon said airplane, a stop disposed within said slot, an extension on said lever adapted to engage said stop, a link pivotally carried on the lever and having a notch adapted to engage said stop, said extension and said link cooperating with said stop to retain said lever in outwardly extended position, the surface of said airplane having a slot for the reception of said lever therein for flight.

5. In an airplane construction including an elongated fuselage platform, a nose compartment and a tail assembly permanently supported at opposite end portions of said platform with a cargo space separating the nose compartment and tail assembly, a lever member pivotally mounted on said airplane adapted to be faired inside of the external surface of said airplane for flight and adapted to be extended upwardly and outwardly from the surface of said airplane as a safety guard for an operator standing upon said airplane, a stop disposed within said slot, an extension on said lever adapted to engage said stop, a link pivotally carried on the lever and having a notch adapted to engage said stop on a side opposite from the extension, said extension and said link cooperating with said stop to retain said lever in outwardly extended position, the surface of said airplane having a slot for the reception of said lever therein for flight.

6. In an airplane construction which comprises an elongated fuselage platform having an exposed deck, a nose compartment and a tail assembly permanently supported at opposite end portions of said platform with a cargo space on said platform separating the nose compartment and tail assembly, a wing having sections including a leading spar and a trailing spar extending laterally from both sides of the platform, the leading spar of the wing section resting on and being supported by said platform, and the trailing spar of said wing section being supported by said platform below the deck thereof, freight container positioning plugs disposed upon said platform, and a pivotally mounted guard member positioned above and relative to said platform; channel beams disposed below and along lateral edges of said platform, said beams having open channel portions disposed so as to face laterally of said platform, said leading spar comprising a beam including an upper member and a lower member vertically spaced by a web, locking strips flanking said web, a V block substantially corresponding to the dihedral of the wing supported on said upper member, an inverted U bracket seating on said block and means depending through said platform and into the channel in said channel beams and accessible therefrom adjustably clamping said spar to said platform, said last named means including a member connected to said bracket and extending through said platform and said channel beams and having threadably adjustable tensioning devices and reinforcing elements disposed within said channel and accessible from the side of said platform for adjustably tensioning said bracket relative to said spar and said platform.

7. An airplane construction comprising an elongated exposed fuselage platform, a nose compartment and a tail assembly permanently supported at opposite end portions of said platform with an open cargo space separating the nose compartment and tail assembly, a wing having sections including a leading spar extending laterally from both sides of the platform, the leading spar of the wing sections resting on and being supported by said platform, freight container positioning plugs disposed upon said platform, and a vantage and observation post provided with a pivotally mounted guard member, said post being positioned above said platform and comprising a housing covering said spar, extending from side to side of said platform and vertically therefrom and defining a streamlined fuselage cross section dividing the cargo space, external step in the sides of said housing to provide access to the top thereof, said steps being normally covered by depressible flaps positioned flush with the sides of said housing.

8. In an airplane of the character described having a skin with a slot therein, a guard member pivotally mounted on said airplane adapted to be faired within said slot for flight and pivotally extensible outwardly from said slot as a safety guard for an operator mounting said airplane, said member comprising a lever pivotally mounted in and extensible from said slot, a stop disposed in said slot, an extension on said lever adapted to engage said stop, a link pivotally carried on the lever and having a notch adapted to engage said stop, said extension and said link cooperating with said stop to releasably retain said lever in an outwardly extended position.

9. In an airplane having an exposed freight platform and a spar structure supported upon said platform, said spar structure including an upper and a lower member vertically spaced by a web and a V block substantially corresponding to the dihedral of the wings supported on said upper member, supporting channel beams disposed below said platform and having open channels accessible from the sides of said platform, an inverted U bracket seating on said block, means extending through said platform and into said channels adjustably clamping said spar structure to said platform.

10. In an airplane an exposed freight platform having a flat deck, containers having bottoms and sockets in said bottoms, said bottoms comprising recessed peripheral edge portions, substantially U-shaped ribs at the edge portions each rib having one leg attached to the container within said respective recessed peripheral edge portion and the other leg in contact with the outer surface of said bottom, said ribs being adapted to rest upon said deck, and one or more reinforcing ribs in contact with the bottom and spaced from and of lesser depth than the first ribs, said sockets being located inwardly relative to said first ribs, and a plug for each socket located on the platform and adapted to project into the socket and to snugly engage the sides thereof.

11. In an airplane an exposed freight platform having a flat deck, containers having substantially flat bottoms and sockets in said bottoms, said bottoms comprising recessed peripheral edge portions, substantially U-shaped ribs at the edge portions each rib having one leg attached to the container within said respective recessed peripheral edge portion and the other leg in contact with the outer surface of said bottom, said ribs being adapted to rest upon said deck, and one or more parallel reinforcing ribs having wide outwardly turned portions in contact with the bottom and spaced from and of lesser depth than the first ribs, one of said outwardly turned portions having a position overlying each said socket and having an aperture therein forming part of the socket, said sockets being located inwardly relative to said first ribs, and a plug for each socket located on the platform having a tapered end adapted to project into the socket and to snugly engage the sides thereof.

HARLAN D. FOWLER.